United States Patent
Sakama

(10) Patent No.: US 8,385,191 B2
(45) Date of Patent: Feb. 26, 2013

(54) LINE BYPASS SYSTEM USING VENDOR SPECIFIC AREA OF COMMON PUBLIC RADIO INTERFACE (CPRI)

(75) Inventor: Tadayuki Sakama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1118 days.

(21) Appl. No.: 11/896,074

(22) Filed: Aug. 29, 2007

(65) Prior Publication Data

US 2008/0089689 A1 Apr. 17, 2008

(30) Foreign Application Priority Data

Oct. 13, 2006 (JP) ................................. 2006-280498

(51) Int. Cl.
*H04L 12/26* (2006.01)
(52) U.S. Cl. ........ 370/225; 370/228; 455/423; 455/424; 455/560; 455/561
(58) Field of Classification Search .................. 455/424, 455/456.5, 550.1, 561, 551, 560, 422.1, 423, 455/67.11, 115.1, 226.1, 426.1, 426.2, 428, 455/524, 525, 562.1; 370/216, 241, 242, 370/244, 250, 217–228, 310.2, 328, 338, 370/352–360; 340/3.43, 3.44; 714/2
See application file for complete search history.

(56) References Cited

U.S. PATENT DOCUMENTS

| | | | | |
|---|---|---|---|---|
| 6,577,632 B2 * | 6/2003 | Hara et al. | ................. | 370/395.1 |
| 6,594,496 B2 * | 7/2003 | Schwartz | ..................... | 455/509 |
| 7,006,826 B2 * | 2/2006 | Cao et al. | ...................... | 455/438 |
| 7,460,513 B2 * | 12/2008 | Osterling | ...................... | 370/342 |
| 2011/0032910 A1 * | 2/2011 | Aarflot et al. | ................. | 370/335 |

FOREIGN PATENT DOCUMENTS

| | | |
|---|---|---|
| JP | 08-149180 | 6/1996 |
| JP | 2001-45569 A | 2/2001 |
| JP | 2001-298461 | 10/2001 |
| JP | 2007-189675 A | 7/2007 |
| WO | WO-2005/048624 | 5/2005 |
| WO | WO-2006/040653 | 4/2006 |

OTHER PUBLICATIONS

CPRI Common Public Interface, CPRI Specification V1.3 (http://www.cpri.info/spec.html); Oct. 1, 2004.
European Search Report mailed Mar. 15, 2012 for corresponding European Application No. EP 07115351.
"CPRI Specification V2.1, Common Public Radio Interface (CPRI); Interface Specification", Internet Citation, Mar. 31, 2006, XP002404197, Retrieved from internet: URL: http://www.cpri.info/downloades/CPRI_Specification_V_2_1.pdf (Retrieved on Oct. 23, 2006), by Ericsson AB, Huawei Technologies Co., Ltd, NEC Corporation, Nortel Networks SA and Siemens AG.

* cited by examiner

*Primary Examiner* — Jinsong Hu
*Assistant Examiner* — San Htun
(74) *Attorney, Agent, or Firm* — Fujitsu Patent Center

(57) ABSTRACT

To provide means for taking action against a fault of a CPRI link of a radio base station in which a CPRI is used as an internal interface between a radio control unit and a radio unit at a low cost, a communication device for directly connecting a plurality of radio units and a device for realizing a bypass route of the CPRI link for connecting a pertinent radio unit to the radio control unit by the communication device and a vendor specific area on a CPRI link connecting another radio unit to the radio control unit are provided.

16 Claims, 8 Drawing Sheets

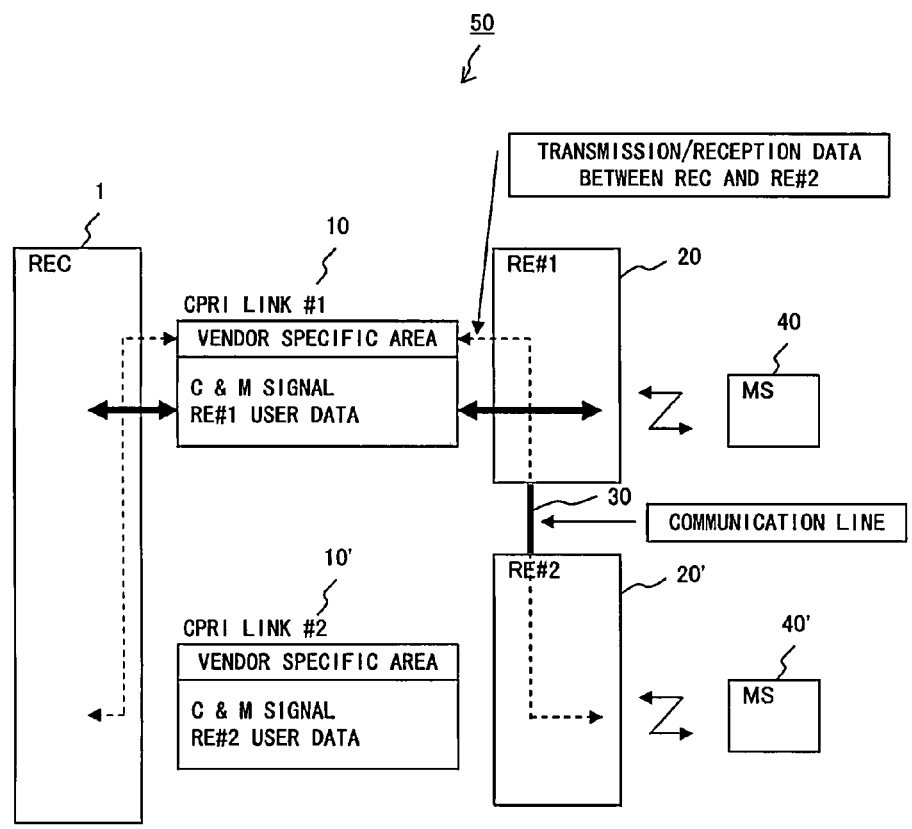
F I G. 3

LINE BYPASS SYSTEM USING VENDOR SPECIFIC AREA OF COMMON PUBLIC RADIO INTERFACE (CPRI)

BACKGROUND OF THE INVENTION

1. Field of the Invention

The present invention relates to a line bypass system for a radio base station (hereinafter referred to as a CPRI radio base station) for adopting the CPRI (Common Public Radio Interface) as an open interface in the radio base station where the control unit and the radio unit are named as an REC (radio equipment control) and an RE (radio equipment) in the CPRI respectively, and both units are disposed separately and connected by an optical fiber line.

2. Description of the Related Art

The common mounting mode for a recent radio base station is a one-to-n connection form in which a radio control unit (REC) and n radio units (REs) located in separate places are connected by optical fibers. There are increasing cases in which the Common Public Radio Interface (CPRI) is used in an interface unit between the REC and REs. The detailed contents of the CPRI can be acquired by accessing the non-patent document described below.

FIG. 1 is a schematic chart of the radio base station in which the above-mentioned CPRI is adopted as an internal interface.

A radio base station (100) is configured by a REC (101), n REs (120), and a CPRI link (110) by the optical fiber connecting each RE (120) with the REC (101). The RE (120) is provided in, for instance, an underground mall or similar location, and a mobile terminal (140) can be used even when it is located in a place where radio waves cannot reach from the point where the REC (101) is mounted.

With the above-mentioned configuration of the radio base station (100), when there occurs a disconnection of an optical fiber between the REC and an RE, the RE that is connected by the disconnected optical fiber cannot transmit a signal (user data, monitor/control signal, etc.) to or receive it from the REC, and enters the inoperable state, and the mobile terminal (140) enters the intra-cell wait status, thereby disabling communications to be performed.

Normally, to avoid the above-mentioned problems, a plurality of optical fibers of an equal transmission capacity are mounted between the REC and the RE so that the optical circuit can have a redundant configuration. However, since a plurality of optical fibers are used, the mounting cost inevitably increases.

Furthermore, as shown in FIG. 2, when there occurs a fault in a CPRI link #2 (110') between an RE#2 (120') and the REC (101), and if the above-mentioned problem is to be solved by transmitting and receiving data between the RE#2 (120') and the REC (101) through the communication line (130) and the RE#1 (120), then the data between the REC (101) and the RE#1 (120) and the data between the REC (101) and the RE#2 (120') flow through the CPRI link #1 (110). Therefore there arises the problem that the transmission capacity of the optical circuit between the REC (101) and the RE#1 (120) has to be increased. As other measures against a fault of a communication system, for instance, there are the techniques described in the following patent documents 1 and 2.

The technique disclosed by the patent document 1 is measure against a fault by what is called an N+1 configuration. Although the N+1 configuration is more economical than the duplex configuration, a standby link and one RE has to be provided for N links and N REs if it is applied to the CPRI link of the CPRI radio base station. However, since each RE is provided in a different place, and it is not predictable that a fault occurs in the link of which RE, the N+1 configuration cannot be adopted to the CPRI link fault in the CPRI radio base station.

What is disclosed by the patent document 2 relates to the ATM exchange network, and a standby connection is established or reserved in case of a fault of the current connection in operation. That is, it originally relates to the technique for an exchange network in which there are a plurality of connection routes between nodes, and cannot be applied to a 1-to-N connection such as a CPRI radio base station and the like.

[Patent Document 1] Japanese Published Patent Application No. H08-149180

[Patent Document 2] Japanese Published Patent Application No. 2001-298461

[Non-patent Document 1] CPRI Common Public Radio Interface (http:/www.cpri.info/spec.html)

SUMMARY OF THE INVENTION

The present invention aims at providing means for take action against a CPRI link fault of a CPRI radio base station at a lower cost.

The present invention provides a communication device for directly connecting a plurality of radio units configuring a CPRI radio base station, and a device for enabling a vendor specific area on the communication device and a CPRI link connecting another radio unit to the radio control unit to be a bypass route of the CPRI link for connecting a pertinent radio unit to the radio control unit.

Using the device, a low cost bypass route can be configured between the radio control unit and the radio unit without requiring a redundant configuration of the CPRI link between the radio control unit and the radio unit or without increasing the transmission capacity of the CPRI link between the radio control unit and the radio unit.

BRIEF DESCRIPTION OF THE DRAWINGS

FIG. 3 shows an example of the basic principle and the basic configuration according to the present invention;

DESCRIPTION OF THE PREFERRED EMBODIMENT

FIG. 3 shows an example of the basic principle of the present invention and an example of the basic configuration according to an aspect of embodying the present invention.

A radio base station (50) of an aspect of embodying the present invention illustrated in FIG. 3 includes a radio control device REC (1), two radio devices RE#1 (20) and RE#2 (20'), a CPRI link #1 (10) connecting the radio control device REC (1) to the RE#1 (20), a CPRI link #2 (10') connecting the radio control device REC (1) to the RE#2 (20'), and a communication line (30) connecting the RE#1 (20) and the RE#2 (20'). The RE#1 (20) and the RE#2 (20') relay the transmission and reception by wireless to and from the respective mobile terminals (40, 40') in the respective cells.

The format of the data transmitted on the CPRI link #1 (10) and the CPRI link #2 (10') comprises an area assigned to a control and management signal (C & M signal), an area assigned to user data, and a vendor specific area whose use is left to a carrier (vendor) for operating a mobile communication system and providing a mobile communication service for a user.

The present invention uses the communication line (30) and the vendor specific area of the CPRI link #1 (10) as a backup route of the CPRI link #2 (10'). In the example shown in FIG. 3, two radio devices are used. However, in case three or more radio devices are used, a bypass route can be set by providing a communication line for connecting the radio devices, determining the CPRI link of a partner radio device of which the vendor specific area is used as a backup route for each CPRI link. In this case, the communication line can be in various modes such as a plurality of one-to-one connections so far as a bypass route can be formed.

If there occurs a fault in the CPRI link #2 (10'), the user data area of the CPRI link #1 (10) is used by the user data of a mobile terminal (40) located in the cell of the RE#1 (20) but the vendor specific area of it is used by the transmission/reception data between the REC (1) and the RE#2 (20') including the user data of a mobile terminal (40') located in the cell of the RE#2 (20').

Figure 1:
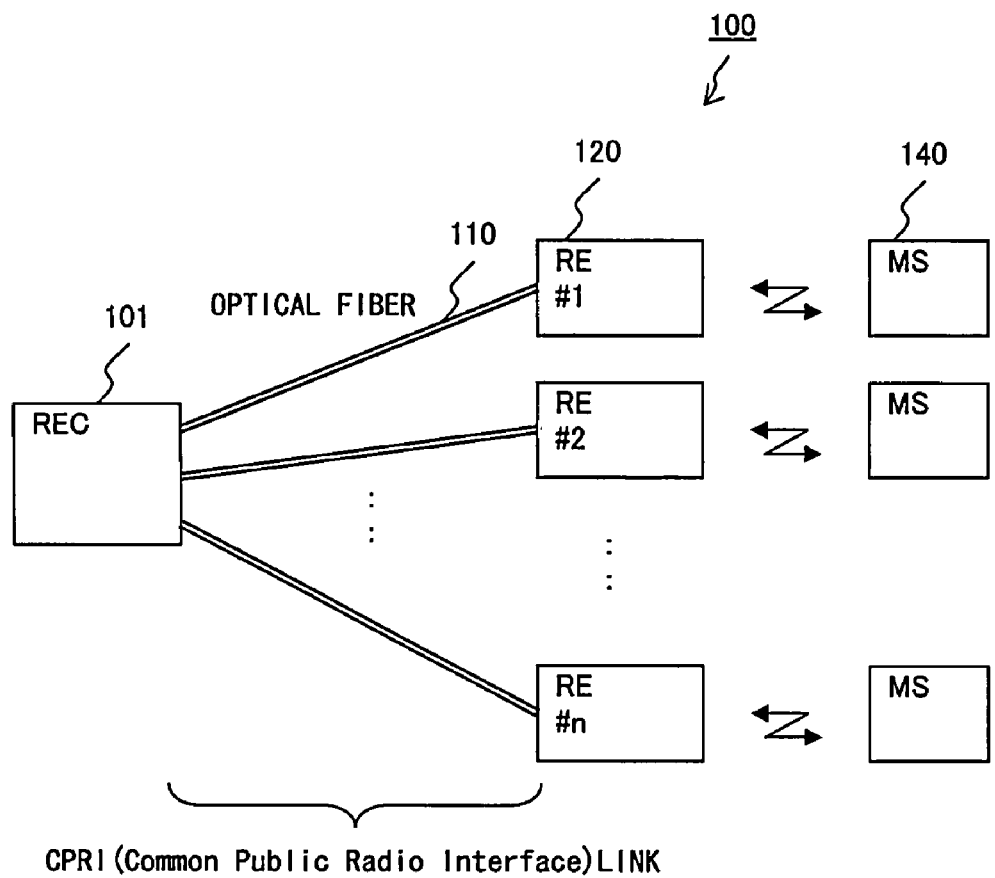
FIG. 1 is a schematic chart of a radio base station in which the common public radio interface is adopted as an internal interface.
Figure 2:
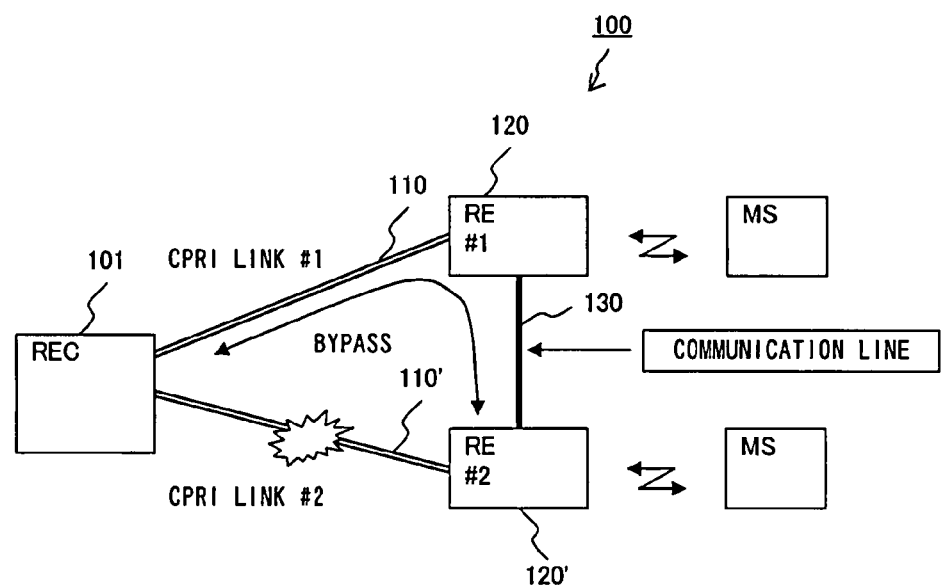
FIG. 2 shows an example of the conventional line bypass system in the radio base station shown in FIG. 1.
Figure 4:
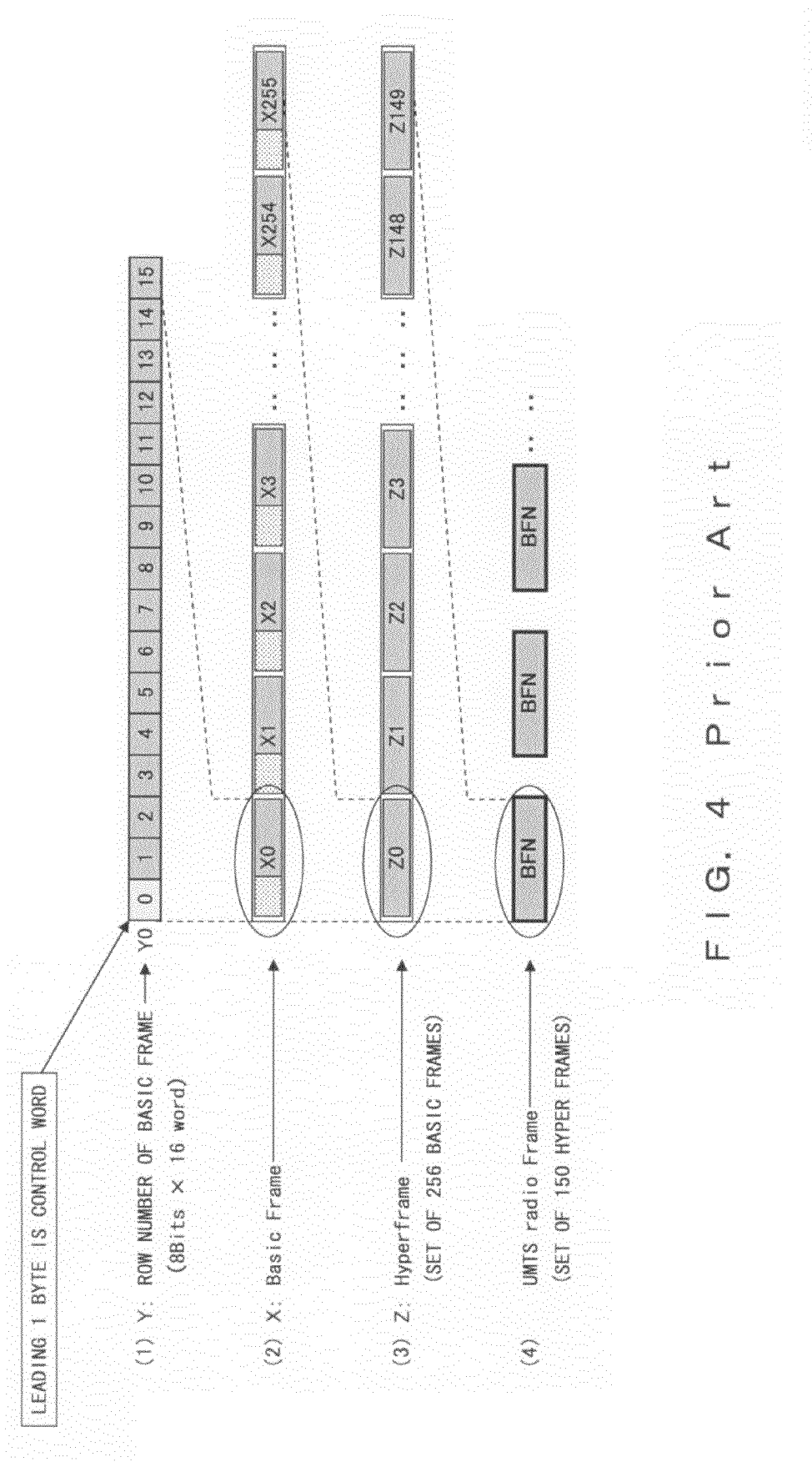
FIG. 4 is an explanatory view showing an example of a frame structure of data transmitted simultaneously and continuously in the CPRI.

FIG. 4 is an explanatory view showing an example of a frame structure of an UMTS radio frame as the data transmitted simultaneously and continuously in the CPRI. In the CPRI, although there are various types of frame structures depending on the bit speed and the like, but only typical examples are introduced below. The UMTS is short for a universal mobile telecommunication system as one of the standards of the third generation mobile communication systems with which the CPRI is in accordance.

(1) in FIG. 4 shows the configuration of the basic frame as the structure at the lowest level. The basic frame is formed by 16 8 bit-words. These words are expressed by Y0, Y1, ..., Y15, and the Y0, Y1, etc. are referred to as the row numbers of the basic frame. The leading word (bytes) of the basic frame is a control word assigned to a control signal.

(2) in FIG. 4 shows the configuration of a hyperframe formed by 256 basic frames. The basic frame in the hyperframe is expressed by X0, X1, ..., X255. 256 control words are assigned to one hyperframe.

(3) in FIG. 4 shows the configuration of an UMTS radio frame formed by 150 hyperframes. The hyperframes in the UMTS radio frame is expressed by Z0, Z1, ..., Z149.

(4) in FIG. 4 shows the process of sequentially transmitting the each UMTS radio frame as a group of simultaneously and continuously transmitted data. Each of the UMTS radio frames are sequentially assigned a node B frame number (BFN) and transmitted.

As explained above, a word flowing on the CPRI link specified by the BFN the transmitted UMTS radio frame that contains it, and is designated the position in the UMTS radio frame by the above-mentioned X, Y, and Z coordinates.

Therefore, the control word in the hyperframe can be identified by (X#, Y0), #=0, 1, ..., 255.

Figure 5:
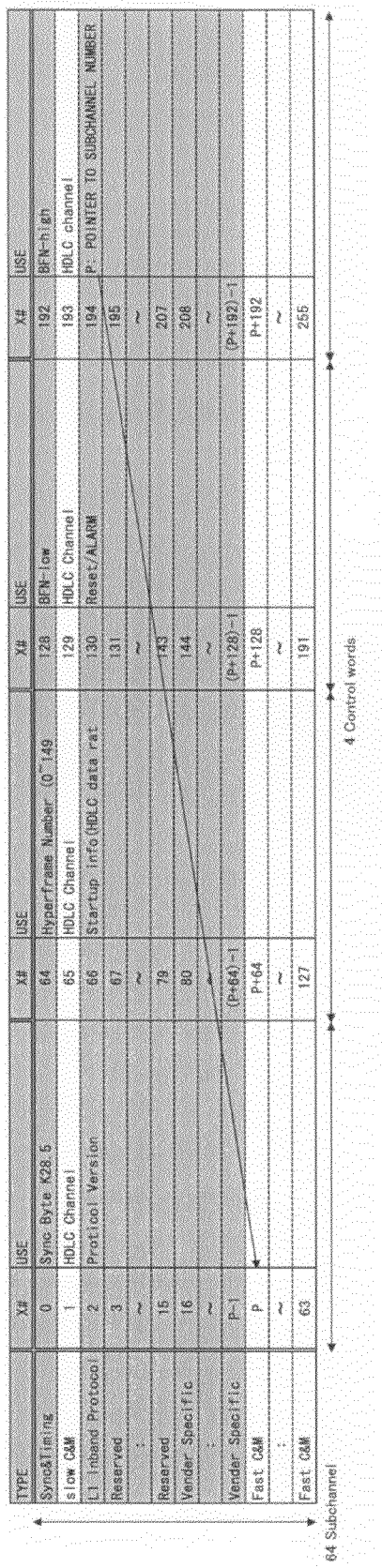
FIG. 5 is an explanatory view showing how the control word in the hyperframe is used.

FIG. 5 is an explanatory view showing how 256 control words in a hyperframe are used. As shown in FIG. 5, 64 subchannels are configured by arranging 4 columns by 64 rows, the type of control signal is determined for each subchannel, and a use of each column (word) is determined.

A vendor specific area is assigned from the subchannel 16 to the subchannel P−1, and the value of P is specified by the fourth word of the subchannel 2, for example, X194 in the X coordinates.

Since the maximum value of P is 63, at maximum a half of the area assigned to the control data is defined as a vendor specific area to be used as a backup route. Therefore, as explained later, when the vendor specific area is used as a backup route, it is desired that traffic control is performed.

Figure 6:
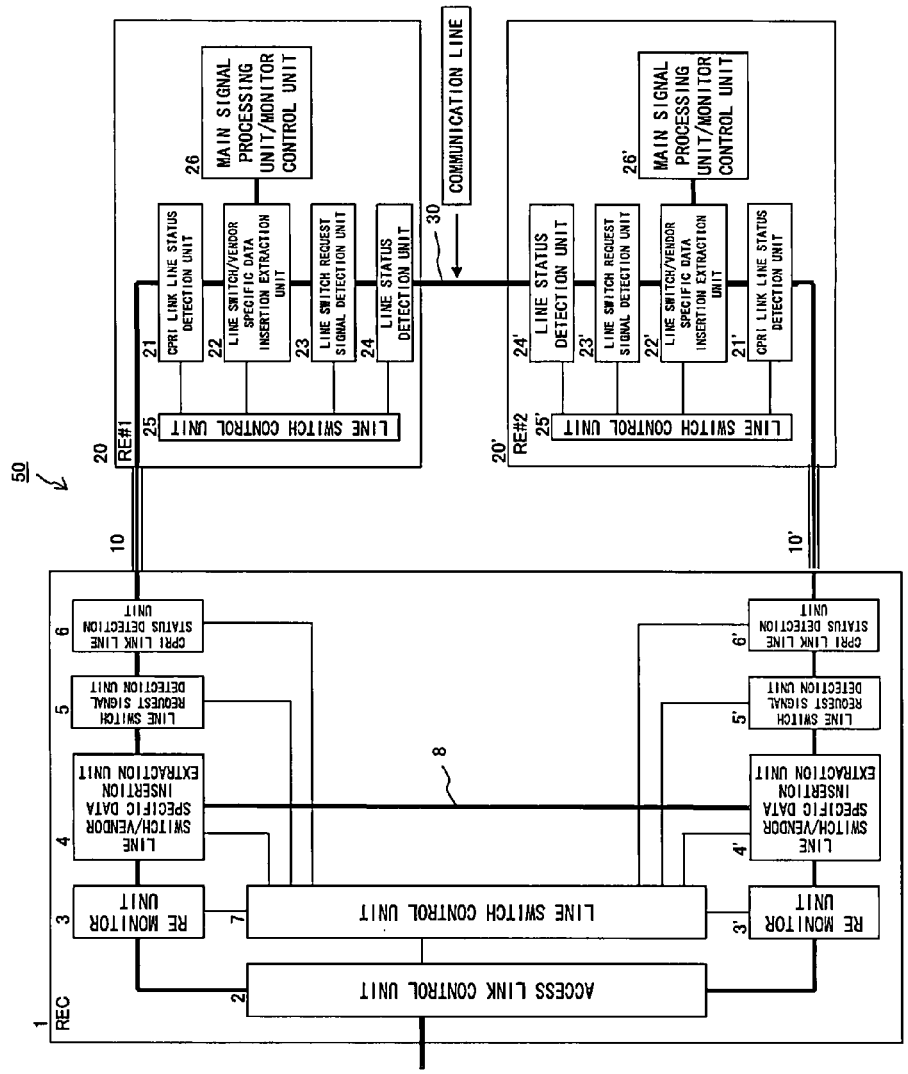
FIG. 6 shows an example of the block diagram of the functioning of the radio base station shown in FIG. 3.

FIG. 6 shows an example of the block diagram of the functioning of the radio base station (50) according to the aspect embodying the present invention shown in FIG. 3. The portion assigned the same reference numeral as shown in FIG. 3 is the same as that explained above by referring to FIG. 3.

The radio control device REC (1) is configured by an access link control unit (2) and a line switch control unit (7) as common devices, RE monitor units (3, 3') respectively corresponding to the RE#1 (20) and the RE#2 (20'), line switch/vendor specific data insertion extraction units (4, 4'), line switch request signal detection units (5, 5'), CPRI link line status detection units (6, 6'), and a bypass bus (8) as a bypass communication route connecting the line switch/vendor specific data insertion extraction units (4, 4'). The portions not directly associated with the present invention are omitted in this configuration. The bypass communication route is not limited to a bus. For example, it can be an N-to-N connection network for directly connecting a plurality of line switch/vendor specific data insertion extraction units.

The radio device RE#1 (20) is configured by a CPRI link line status detection unit (21), a line switch/vendor specific data insertion extraction unit (22), a line switch request signal detection unit (23), a line status detection unit (24) for detecting the status of the communication line (30), a line switch control unit (25), and a main signal processing unit/monitor control unit (26). The portion of the radio transmission/reception function is omitted here.

The configuration of the radio device RE#2 (20') is the same as that of the radio device RE#1 (20).

The switching operation of the radio base station (50) shown in FIG. 6 to a bypass route in case of a fault of a CPRI link is explained below by referring to FIGS. 7 and 8.

Figure 7:
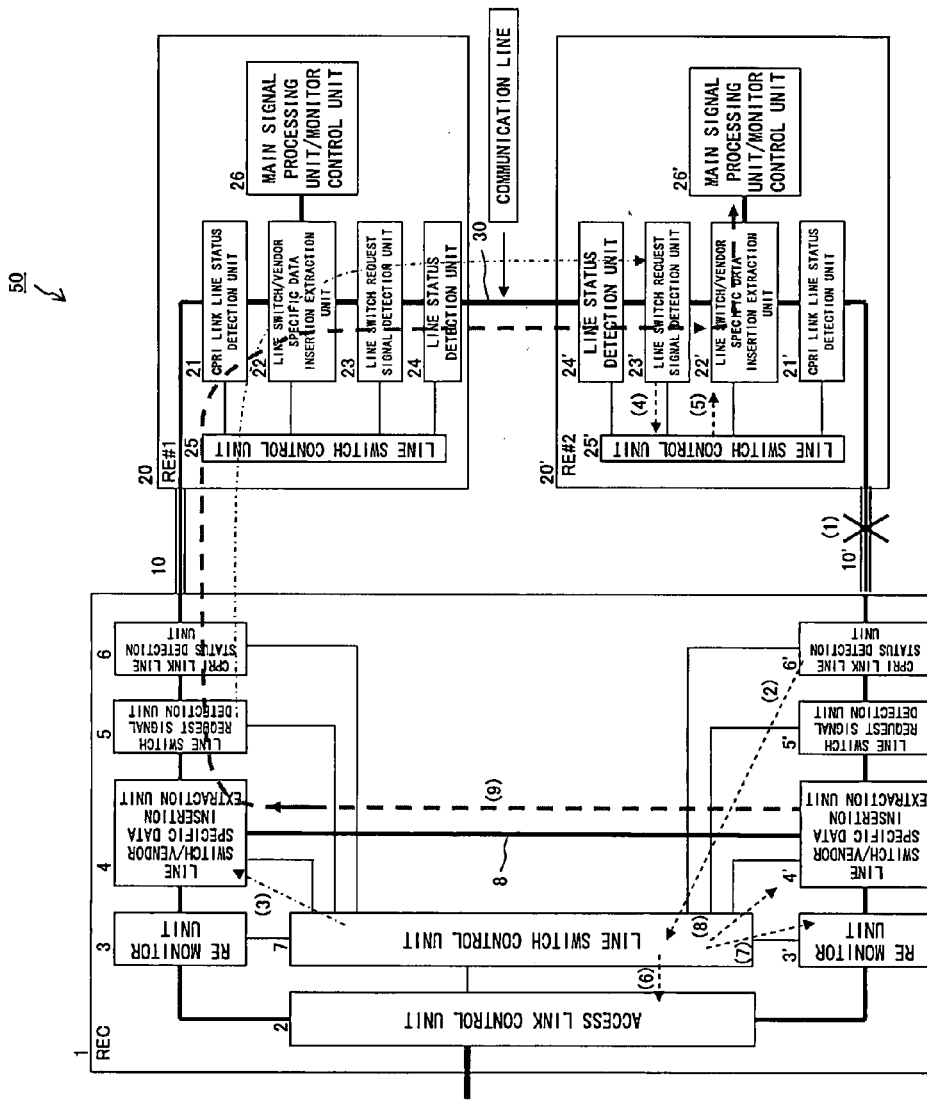
FIG. 7 shows a switching operation to the bypass route lead by the radio control device.

FIG. 7 shows the switching operation to a bypass route mainly lead by the radio control device REC (1).

(1) When the communication using the CPRI link (10') becomes inoperative by an occurrence of a fault in the CPRI link (10'), a CPRI link disconnection is detected by the CPRI link line status detection unit (6') of the REC (1), (2) the information is reported to the line switch control unit (7).

(3) The line switch control unit (7) transmits a line switch request signal to a line switch/vendor specific data insertion extraction unit (4).

(4) The line switch/vendor specific data insertion extraction unit (4) inserts the line switch request signal into a specific address (refer to FIG. 5) of the vendor specific area of the CPRI signal to the RE#1 (20). The RE#1 (20) extracts the line switch request signal from the vendor specific area of the CPRI signal received by the line switch/vendor specific data insertion extraction unit (22), and transmits it to the communication line (30) for the RE#2 (20'). When the line switch request signal is extracted by the line switch request signal detection unit (23'), the RE#2 (20') transmits a line switch request to a line switch control unit (25').

(5) Thus, the line switch control unit (25') performs line switch control on the line switch/vendor specific data insertion extraction unit (22').

(6) Next, the line switch control unit (7) of the radio control device REC (1) transmits a notification to limit the amount of user data to the access link control unit (2). Thus, the access link control unit (2) performs call control and the like, and reduces the amount of user data. Practically, calls are limited to, for instance, urgent calls for the mobile terminal (40') accommodated in the RE#2 (20'). The amount of user data can also be reduced by limiting the service type to the service for urgent mail.

(7) The line switch control unit (7) also transmits a notification to a RE monitor unit (3'). In response to the notification, the RE monitor unit (3') extends the transmission interval of a polling signal to the RE#2 (20'). It is obvious that the polling signal is transmitted to the RE#2 (20') through the bypass route using the bypass bus (8) etc.

(8) Next, the line switch control unit (7) transmits a switch request to a line switch/vendor specific data insertion extraction unit (4').

(9) The line switch/vendor specific data insertion extraction unit (4') switches the route of the data for the RE#2 (20') to the direction of the bypass bus (8).

After the above-mentioned switch operation, the data to the RE#2 (20') is transmitted as follows.

The line switch/vendor specific data insertion extraction unit (4) inserts the data received from the line switch/vendor specific data insertion extraction unit (4') into the vendor specific area of the CPRI signal for the RE#1 (20), and transmits it to the RE#1 (20).

The RE#1 (20) uses the line switch/vendor specific data insertion extraction unit (22) to extract data from the vendor specific area and transmit it to the communication line (30).

The RE#2 (20') passes the data received from the communication line (30) to a main signal processing unit/monitor control unit (26') through the line switch/vendor specific data insertion extraction unit (22').

The main signal processing unit/monitor control unit (26') performs a process on a main signal according to a control signal in the received data and performs monitor control, and payload data is transmitted from the radio transmission unit not shown in the attached drawings to a mobile terminal.

The uplink data from the mobile terminal is transmitted in the direction opposite to the route of transmitting above-mentioned data.

Figure 8:
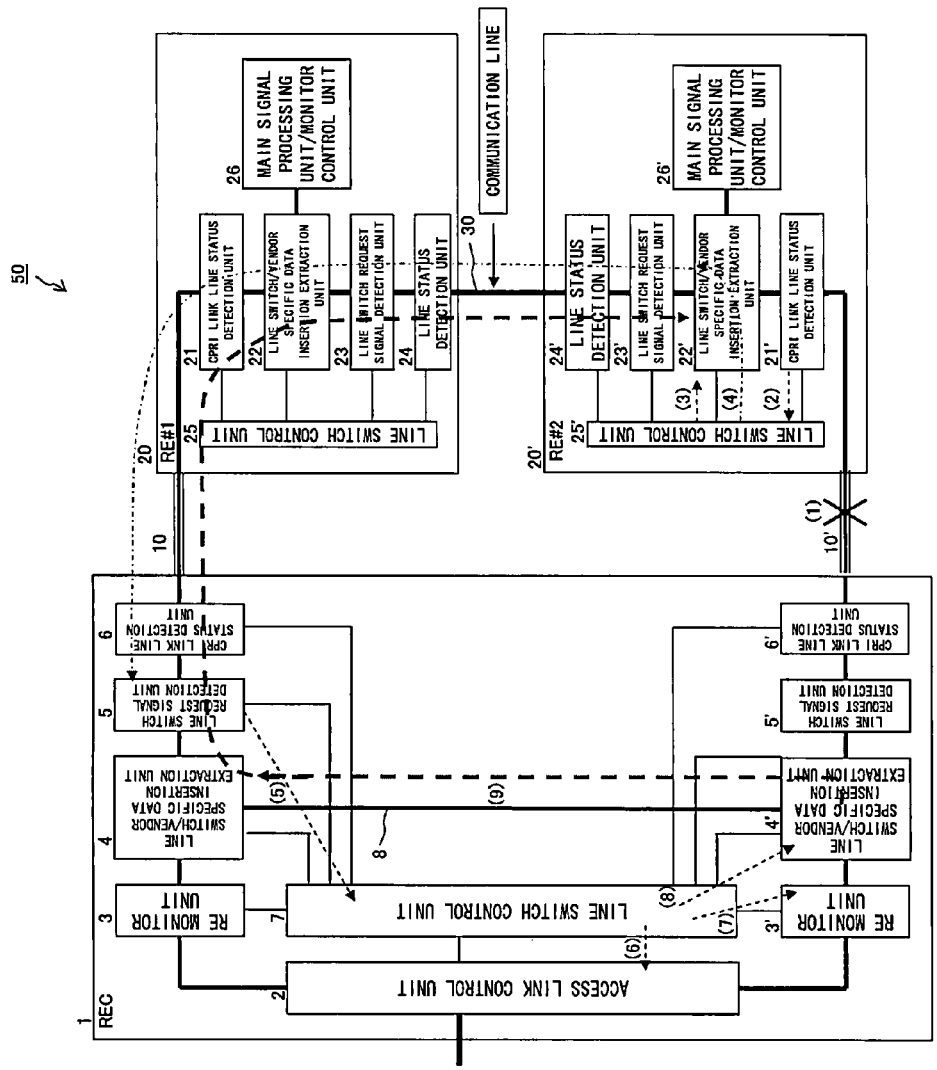
FIG. 8 shows a switching operation to the bypass route lead by the radio device.

FIG. 8 shows the switching operation to the bypass route lead by the radio device.

(1) When a fault occurs in the CPRI link (10') and the communication using the CPRI link (10') becomes inoperative, a CPRI link line status detection unit (21') of the RE#2 (20') detects a CPRI link disconnection, and (2) the information is reported to the line switch control unit (25').

(3) The line switch control unit (25') transmits a line switch request signal to the line switch/vendor specific data insertion extraction unit (22'), and (4) transmits the line switch request signal to the communication line (30).

(5) The line switch/vendor specific data insertion extraction unit (22) of the RE#1 (20) that receives the line switch request signal inserts the line switch request signal into a specific address of the vendor specific area of the CPRI signal to the REC (1). In the REC (1), the line switch request signal detection unit (5) detects the line switch request signal received in the vendor specific area, and notifies the line switch control unit (7) of the line switch request signal.

(6) Next, the line switch control unit (7) transmits the notification to limit the amount of user data to the access link control unit (2). In response to the notification, the access link control unit (2) performs call control and the like, and reduces the amount of user data.

(7) Furthermore, the line switch control unit (7) transmits a notification also to the RE monitor unit (3'). In response to the notification, the RE monitor unit (3') extends the transmission interval of the palling signal to the RE#2 (20').

(8) Next, the line switch control unit (7) transmits a switch request to the line switch/vendor specific data insertion extraction unit (4'), and (9) the line switch/vendor specific data insertion extraction unit (4') switches the route of the data for the RE#2 (20') to the direction of the bypass bus (8).

The operation of transmitting data to the RE#2 (20') after switching the route, and the operation of receiving uplink data are the same as those explained by referring to FIG. 7.

As explained above, according to the present invention, a bypass bus is provided for the radio control unit, a communication line is provided between radio units, and a bypass route is formed together with the vendor specific area on the CPRI link, a bypass route can be provided at a low cost when a fault of the CPRI link occurs.

Then, by storing the information that the line has been switched to the bypass route in the line switch/vendor specific data insertion extraction units (4, 4') and the like, when the radio control unit transmits data to and receives data from the radio unit, the radio unit not directly connected via the CPRI link can be recognized and controlled as correctly as a directly connected radio unit.

What is claimed is:

1. A radio base station in which a radio control equipment is connected to a plurality of radio equipment via a Common Public Radio Interface (CPRI) link using a common public radio interface, comprising:

a communication line directly connecting between the plurality of radio equipment, a vendor specific area on the CPRI link of another radio equipment and the communication line are defined as a bypass route of the CPRI link connecting a pertinent radio equipment to the radio control equipment, the radio control equipment comprises a plurality of line switch/data extraction and insertion units corresponding to the plurality of radio equipment for switching a line and inserting and extracting data in the vendor specific area; and a bypass communication route interconnecting the plurality of line switch/data extraction and insertion unit, the line switch/data extraction and insertion unit switches a line route from the CPRI link to the bypass communication route when there occurs a fault in the CPRI link to the corresponding radio equipment, inserts transmission data to the other radio equipment transmitted through the bypass communication route into the vendor specific area on the CPRI link for the corresponding radio equipment when the vendor specific area on the CPRI link to the corresponding radio equipment is used as a bypass route of another radio equipment other than the corresponding radio equipment, and transmits uplink data from the other radio equipment transmitted after inserted into the vendor specific area on the CPRI link for the corresponding radio equipment to the bypass communication route; and the line switch/data extraction and insertion unit corresponding to the other radio equipment fetches the uplink data from the other radio equipment through the bypass communication route.

2. The radio base station according to claim 1, wherein the radio control equipment places a restriction on an amount of data to and from the radio equipment when a connection to the radio equipment is performed using a vendor specific area on a CPRI link for connection to another radio equipment.

3. The radio base station according to claim 2, wherein the amount of data is restricted by limiting a call of the radio equipment to an urgent call.

4. The radio base station according to claim 2, wherein the amount of data is restricted by extending a polling interval to the radio equipment.

5. The radio base station according to claim 1, wherein the radio equipment comprises a line switch/data extraction and insertion unit for switching a line and inserting and extracting data into and from the vendor specific area, wherein when a fault occurs in the CPRI link to the radio control equipment, the line switch/data extraction and insertion unit switches a line route from the CPRI link to the communication line, transmits uplink data to the radio control equipment to the communication line, and fetches transmission data transmitted through the communication line, and when the vendor specific area on the CPRI link to the radio control equipment is used as a bypass route of another radio equipment, the line switch/data extraction and insertion unit inserts the uplink data from the other radio equipment transmitted through the communication line into the vendor specific area on the CPRI link to the radio control equipment, and transmits to the communication line the transmission data, which is to be transmitted to the other radio equipment, inserted into the vendor specific area on the CPRI link to the radio control equipment, and then transmitted.

6. The radio base station according to claim 1, wherein the communication line is to send a frame of data including a vendor specific area to be used as a backup route including the communication line.

7. The radio base station according to claim 6, wherein the frame of data includes control data area and a maximum a half of the control data area can be assigned to the vendor specific area.

8. A radio control equipment connected to a plurality of radio equipment via a Common Public Radio Interface (CPRI) link using a common public radio interface, comprising:
a communication line directly connecting between the plurality of radio equipment, a vendor specific area on the CPRI link of another radio equipment and the communication line are defined as a bypass route of the CPRI link connecting a pertinent radio equipment to the radio control equipment, the radio control equipment comprises a plurality of line switch/data extraction and insertion units corresponding to the plurality of radio equipment for switching a line and inserting and extracting data in the vendor specific area;
a plurality of line switch/data extraction and insertion units corresponding to the plurality of radio equipment for switching a line and inserting and extracting data in a vendor specific area; and
a bypass communication route interconnecting the plurality of line switch/data extraction and insertion unit, the line switch/data extraction and insertion unit switches a line route from the CPRI link to the bypass communication route when there occurs a fault in the CPRI link to the corresponding radio equipment, inserts transmission data to the other radio equipment transmitted through the bypass communication route into the vendor specific area on the CPRI link for the corresponding radio equipment when the vendor specific area on the CPRI link to the corresponding radio equipment is used as a bypass route of another radio equipment other than the corresponding radio equipment, and transmits uplink data from the other radio equipment transmitted after inserted into the vendor specific area on the CPRI link for the corresponding radio equipment to the bypass communication route; and the line switch/data extraction and insertion unit corresponding to the other radio equipment fetches the uplink data from the other radio equipment through the bypass communication route.

9. The radio control equipment according to claim 8, wherein the bypass communication route is a bus.

10. The radio control equipment according to claim 8, wherein the bypass communication route is a N-to-N connection network.

11. A radio equipment connected to a plurality of radio equipment via a Common Public Radio Interface (CPRI) link using a common public radio interface, comprising:
a communication line directly connecting between the plurality of radio equipment, a vendor specific area on the CPRI link of another radio equipment and the communication line are defined as a bypass route of the CPRI link connecting a pertinent radio equipment to the radio control equipment, a plurality of line switch/data extraction and insertion units corresponding to the plurality of radio equipment for switching a line and inserting and extracting data in the vendor specific area;
a bypass communication route interconnecting the plurality of line switch/data extraction and insertion unit; and
a line switch/data extraction and insertion unit switching a line and inserting and extracting data into and from a vendor specific area, when a fault occurs in a Common Public Radio Interface (CPRI) link to a radio control equipment, the line switch/data extraction and insertion unit switches a line route from the CPRI link to a communication line, transmits uplink data to the radio control equipment to the communication line, and fetches transmission data transmitted through the communication line, and when the vendor specific area on the CPRI link to the radio control equipment is used as a bypass route of another radio equipment, the line switch/data extraction and insertion unit inserts the uplink data from the other radio equipment transmitted through the communication line into the vendor specific area on the CPRI link to the radio control equipment, and transmits to the communication line the transmission data, which is to be transmitted to the other radio equipment, inserted into the vendor specific area on the CPRI link to the radio control equipment, and then transmitted.

12. A line bypass method used in a radio base station in which a radio control equipment is connected to a plurality of radio equipment via a Common Public Radio Interface (CPRI) link using a common public radio interface, comprising:
a communication line directly connecting between the plurality of radio equipment, and in which a vendor specific area on the CPRI link of another radio equipment and the communication line are defined as a bypass route of the CPRI link connecting a pertinent radio equipment to the radio control equipment;
the radio control equipment comprises a plurality of line switch/data extraction and insertion units corresponding to the plurality of radio equipment for switching a line and inserting and extracting data in the vendor specific area, and a bypass communication route interconnecting the plurality of line switch/data extraction and insertion unit;

the radio control equipment detecting a fault of the CPRI link connected to one of the plurality of radio equipment, transmitting a line switch request to another radio equipment by inserting the line switch request into a vendor specific area on a CPRI link connected to the other radio equipment than the radio equipment connected to the CPRI link in which the fault is detected, and the other radio equipment transmitting the line switch request via the communication line to the radio equipment connected to the CPRI link in which the fault has been detected and transmitting uplink data from the other radio equipment transmitted after inserted into the vendor specific area on the CPRI link for the corresponding radio equipment to the bypass communication route; and a line switch/data extraction and insertion unit corresponding to the other radio equipment fetches the uplink data from the other radio equipment through the bypass communication route.

13. The method according to claim 12, further comprising the radio equipment detecting a fault of a CPRI link connecting the radio equipment to the radio control equipment, transmitting the line switch request via the communication line to another radio equipment, and the other radio equipment transmitting the line switch request to the radio control equipment using a vendor specific area on a CPRI link for connection to the radio control equipment.

14. The method according to claim 12, wherein an amount of data on the bypass route is limited.

15. The method according to claim 14, wherein the amount of data is restricted by limiting a call of the radio equipment to an urgent call.

16. The method according to claim 14, wherein the amount of data is restricted by extending a polling interval to the radio equipment.

* * * * *